Oct. 6, 1925.  R. B. FLEMING  1,556,432
SCISSORS SHARPENING MACHINE
Filed July 16, 1923

Inventor
Robert B. Fleming
by H. J. S. Dennison
Atty.

Patented Oct. 6, 1925.

1,556,432

UNITED STATES PATENT OFFICE.

ROBERT B. FLEMING, OF ST. CATHARINES, ONTARIO, CANADA.

SCISSORS-SHARPENING MACHINE.

Application filed July 16, 1923. Serial No. 651,817.

*To all whom it may concern:*

Be it known that I, ROBERT B. FLEMING, a subject of the King of Great Britain, and resident of the city of St. Catharines, county of Lincoln, Province of Ontario, in the Dominion of Canada, have invented certain new and useful Improvements in Scissors-Sharpening Machines, as described in the following specification and illustrated in the accompanying drawings, that form part of the same.

The principal objects of the invention are, to enable barbers, tailors and others using scissors to keep their implements in a proper working condition with very little difficulty and at a remarkably low cost and to provide a very simple and inexpensive form of machine which will quickly sharpen any style of shears.

A further object is to devise a means for sharpening shears with corrugated cutting edges.

The principal feature of the invention consists in the novel construction and arrangement of parts, whereby the blade to be sharpened is held in an adjustable clamp and a sharpening member is operated with a reciprocal movement transversely of the blade.

Figure 1:
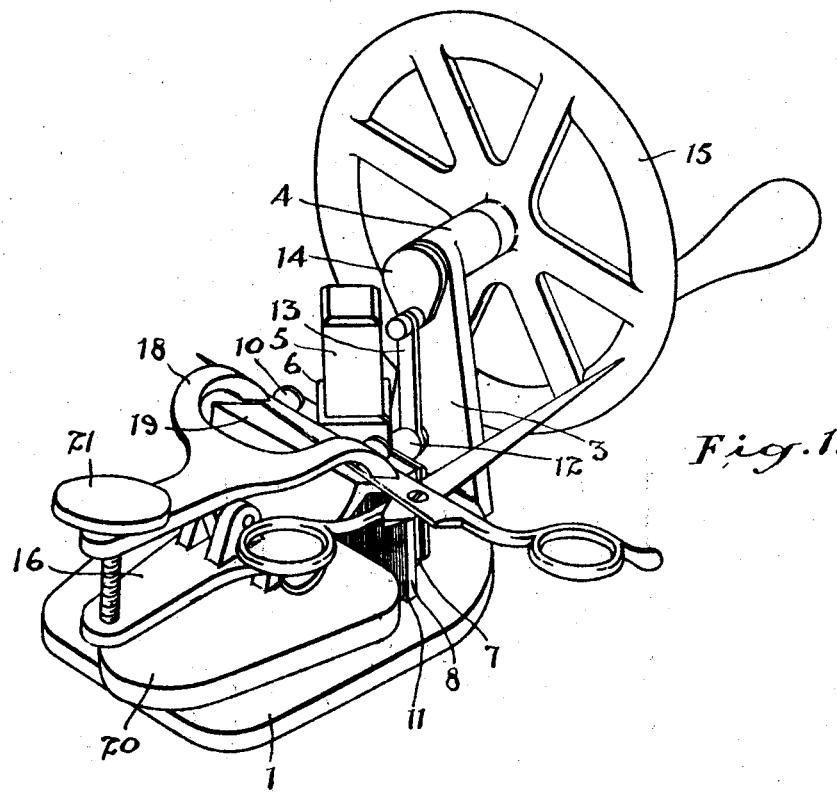
Figure 2:
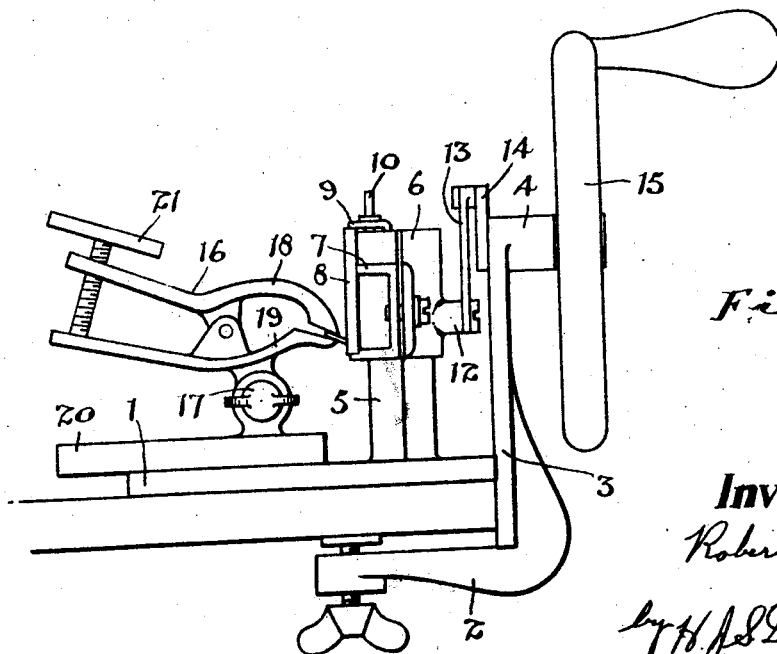

In the drawings Figure 1 is a perspective view of my sharpening machine showing a pair of scissors held therein, and Fig. 2 is a side elevational view.

In the maintenance of scissors and shears it is extremely desirable that the edges be kept true and it is found very desirable, particularly in the sharpening of barbers' scissors to provide a corrugated edge. This is usually done by the use of a hand file.

The present invention consists of a base 1 preferably provided with a suitable clamp 2, said clamp having a rigid vertical arm 3 carrying a horizontal journal 4 at its upper end.

A rigid stud 5, here shown of rectangular cross section (but which may be of any desirable shape) is secured to the base and extends vertically upward therefrom in central alignment with the arm 3.

Upon the stud 5 is slidably mounted a sleeve member 6 which sleeve is provided with a transverse flange 7 upon which is supported a specially cut file section 8. This file section is held securely in place in a vertical position on the flange of the sleeve 6 by suitable clamps 9 and thumb screws 10.

The file is formed with a vertically corrugated surface 11.

The sleeve 6 is formed with a stud 12 on the side opposite to the clamp flange and to this stud is connected a link 13, the other end of which is pivotally secured to a crank 14 supported in the journal 4. This crank is here shown provided with a hand wheel 15, though an ordinary crank handle may be used if desired.

By rotating the handle 15 and crank 14 the link 13 reciprocates the sleeve 6 upon the stud 5 and any surface brought into contact with the reciprocating member will be filed thereby.

A clamp 16 adjustably supported on a pivot 17 is secured to the base 20, said clamp having the upper and lower jaws 18 and 19 pivoted with the forward ends being adapted to grip the scissor blade, said jaws being adjusted to clamp the blade by means of the adjusting screw 21.

In the use of this device it is clamped upon a bench or table in a convenient position. The scissors to be ground are opened and one of the blades is inserted between the clamp jaws and aligned with the face of the file 8. The crank 14 is then operated to reciprocate the file and the clamp 16 is moved so as to bring the edge of the scissor blade into contact with the reciprocating file surface. This file surface being specially shaped with a corrugated or toothed surface cuts the edge of the scissor blade at the desired cutting angle and produces well defined teeth on the blade.

It will be seen that the straight reciprocation of a flat cutting surface on the file 8 will ensure the edge of the scissors being kept perfectly straight, that is, without hollows which is of course extremely desirable and the toothed edge produced by the corrugated file cutters renders the scissors very effective in all classes of work but particularly in connection with barbers' scissors.

What I claim as my invention is:—

1. A scissor sharpening machine comprising a base, a rigid stud extending upwardly from said base, a sleeve non-rotative and slidably mounted on said stud, means for holding the sharpening tool on said sleeve, means for reciprocating said sleeve on said stud and means for supporting the scissor blade in co-operation with the sharpening tool.

2. A scissor sharpening machine comprising a broad smooth base having a stud projection extending vertically therefrom, a sleeve slidably mounted on said stud, means for carrying a sharpening tool on said sleeve, means for reciprocating said sleeve, and a movable holder for holding the scissors slidably and movably arranged on said flat base.

3. A scissor sharpening machine comprising a base having a clamp secured thereto, an upright at one side of the base having a horizontal bearing, a crank member journaled in said bearing, stud rigidly mounted on the base and extending vertically upward therefrom, a sleeve slidably mounted on said stud a connecting rod connecting said crank with said sleeve and adapted to reciprocate said sleeve on the turning of the crank, a sharpening tool, a clamp carried by said sleeve for holding said sharpening tool, and means for holding the scissors.

4. In a scissor sharpening machine, means for holding the scissor blade, a reciprocable member operating transversely of the scissor blade, and a transversely corrugated file secured in said reciprocable member and adapted to cut transverse corrugations in the edge of the scissors.

ROBERT B. FLEMING.